May 28, 1968 M. J. WIGGINS 3,386,079

ERROR REDUCING DEVICE

Filed Oct. 1, 1964 2 Sheets-Sheet 1

INVENTOR.
MACDONALD J. WIGGINS
BY
Julian C. Renfro
ATTOR.

INVENTOR.
MACDONALD J. WIGGINS
BY
Julian C. Renfro
ATTOR.

United States Patent Office 3,386,079
Patented May 28, 1968

3,386,079
ERROR REDUCING DEVICE

Macdonald J. Wiggins, Orange County, Fla., assignor to Martin-Marietta Corporation, Middle River, Md., a corporation of Maryland Filed Oct. 1, 1964, Ser. No. 400,697
10 Claims. (Cl. 340—146.1)

ABSTRACT OF THE DISCLOSURE

This invention relates to a device usable in conjunction with pulse type communication systems for minimizing interference due to the presence of false pulses. Such false pulses may originate as a result of crosstalk, for example, and when they occur during the modulation frame periods in a conventional pulse position modulation system, they are unfortunately passed by the decoder and bring about extraneous noise.

Figure 1:
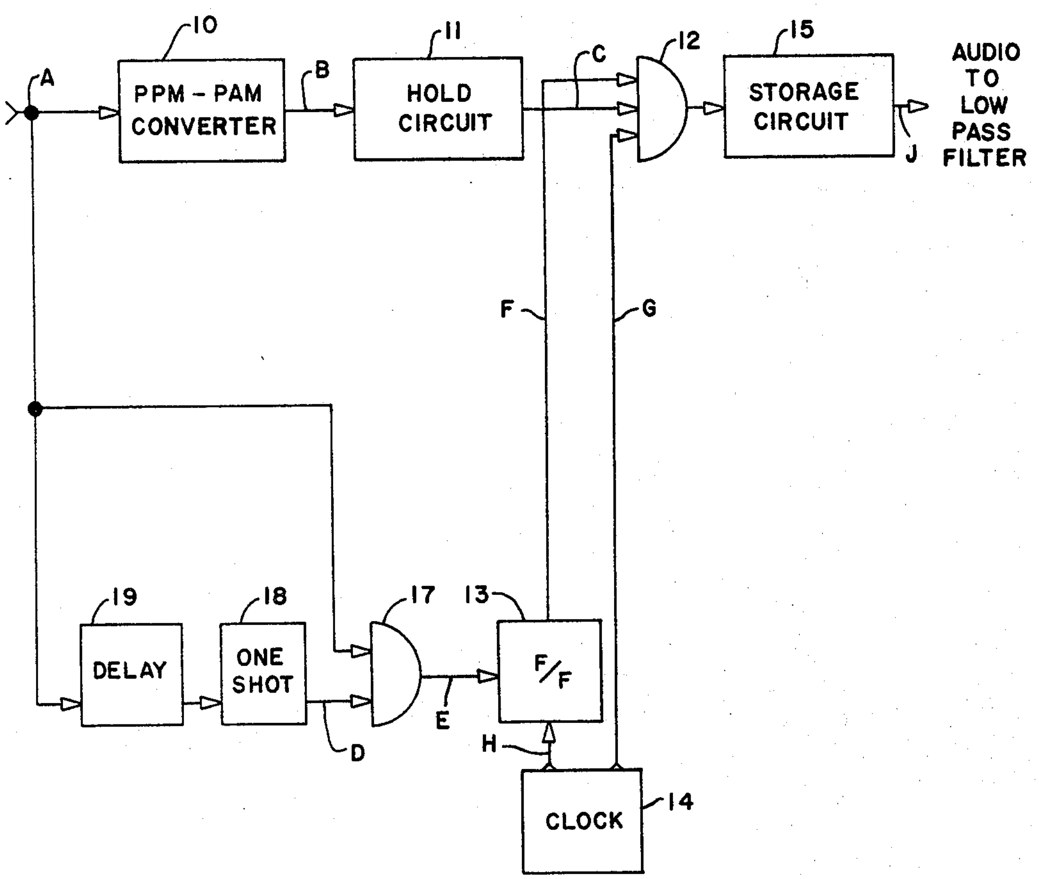

In accordance with this invention, whenever more than one pulse occurs during a modulation frame, all pulses occurring during such frame are rejected or ignored by the demodulator, and the demodulator holds the value of the immediately preceding modulation frame. Significantly, the loss of the correct pulse does not appreciably deteriorate voice quality for error rates of 25% or less, and this scheme is applicable up to error of say 40%.

This invention relates to a concept for greatly reducing the effect of error pulses in pulse type communication systems, and more particularly to a false pulse rejecting detector particularly designed to minimize false pulses occurring due to the crosstalk phenomenon in random access discrete address type pulse communication systems. Significantly, the reduction of the annoying effects of this type of interference is accomplished with only minor degradation of voice quality and intelligibility.

While the present invention is directed to a false pulse eliminating device having wide and general applicability, it will be described for convenience in conjunction with a co-channel pulse type communication system of the person-to-person type. I have particular reference to the RACEP (trademark of Martin-Marietta Corporation) invention of McKay Goode, Ser. No. 107,194, entitled "Discrete Address Communication System With Random Access Capabilities," filed in the U.S. Patent Office on May 2, 1961. This application has now become Patent No. 3,239,761 and is assigned to the assignee of the present invention. That system involves a large group of subscribers having intermittent requirement for communication between various pairs of subscribers, who talk upon more or less conventional type telephone equipment without the use of wires or without the use of a central telephone exchange.

The transmitter and receiver combinations carried by each subscriber of that system may advantageously operate upon the same set of three frequencies, such as 140, 141, and 142 megacycles. Each subscriber's voice is "sampled" at the rate satisfying the Nyquist Sampling criterion (for example, 8,000 samples per second) to obtain a number of amplitude samples which are then converted by known pulse modulation techniques to a series of constant amplitude pulses whose relative positions contain the intelligence. The sampling rate dictates the length of the sampling periods, which will be 125 microseconds long for a sampling rate of 8,000 samples per second, with the position of the pulses in the sampling periods representing the intelligence.

In accordance with the basic random access discrete address system, each position modulated pulse is converted into three pulses, each on a different frequency. These three pulses are coded by delay line techniques, as a result of a user's manipulation of the dial on a transmitter portion of his unit, into a pulse ensemble that will be recognized only by the subscriber that he is calling. Each receiver unit is equipped with delay lines which correlate the three pulses, thus receiving only those pulse ensembles that have been intended for his unit. As will therefore be seen, there is by necessity a considerable amount of sharing of the spectrum in the time domain.

Since a number of simultaneous conversations in the same geographical area may take place, there well may be a large number of pulse ensembles present on the three frequencies. The number of conversations may increase within the capability of the system until pulse density becomes so great as to result in unwanted "crosstalk" representing interference between conversing pairs of discrete address units. This crosstalk unavoidably occurs when pulses from more than one undesired transmission arrive at the receiver such that the code of that receiver is generated by the random time spacings between pulses from such undesired transmissions. Unfortunately, these crosstalk pulses or false pulses are decoded and passed to the demodulator of the receiver. It is toward the reduction of the effect of such crosstalk that the persent invention is directed.

In the pulse position modulation (PPM) system used in conjunction with a preferred embodiment of the RACEP invention, the information-carrying pulses are deviated about a center position at the audio rate, with the maximum deviation or modulation index representing what may be referred to as a modulation frame. The length of this frame in time is a function of the modulation index, and for example, the modulation frame width may vary from 10 microseconds to 50 microseconds for various applications.

As is known, in co-channel systems, false codes will be generated on occasion as described above, which of course, causes false pulses to be passed by the decoder. For such a false pulse to cause an extraneous noise in the audio portion of the system, it must occur during one of the modulation frames, since the remainder of a sampling period would be normally blocked to reject false pulses during times for which no intelligence is expected. As should be well understood, if there is no interference present, then only one pulse, the correct pulse, will appear in any given modulation frame. However, when false pulses are present at the input, the correct pulse as well as one or more error pulses may appear in any given modulation frame.

Statistical analysis of sampled speech waveforms has shown that the most probable value of any given sample is the value of the immediately preceding sample. This is, of course, a consequence of the redundant nature of speech, and upon this factor the present concept is based.

In accordance with this invention, whenever more than one pulse occurs in a modulation frame, all pulses occurring in such frame are rejected or ignored by the demodulator, and the demodulator holds the value of the immediately preceding modulation frame. In other words, my circuit remembers the last audio level rather than accepting erroneous multiple signal information, thus providing a significant improvement in signal-to-noise ratio. Although some intelligence pulses are necessarily lost in this process, due to the highly redundant nature of speech a comparatively large number of voice samples may be lost or omitted with little or no deterioration in voice quality. Extensive testing of equipment constructed in accordance with this invention has shown that for error rates of 25% or less, the loss of the correct pulses does not deteriorate the voice quality. However, for higher error rates degradation is noticeable and when the error rate becomes greater than approximately 40%, this technique becomes no longer applicable.

It is therefore a primary object of this invention to provide a device for eliminating in an economical and highly satisfactory manner the subjective effect of error pulses in pulse position modulation system.

Briefly, my invention is designed to reduce the subjective effect of error pulses contained with a stream of position modulated pulses appearing in successive sampling periods by determining in which sampling periods extraneous pulses are contained, and then inhibiting from the output of the demodulator, all pulses in each sampling period in which extraneous pulses are contained, the output of the demodulator at such times in which the pulses of a sampling period are inhibited being maintained at a level in accordance with the preceding sample period in which a correct pulse was contained.

More particularly, this invention may comprise means for converting position modulated pulses to amplitude modulated pulses as well as means for holding the amplitude of a given output pulse from the converter. Means are also provided for reading out the held amplitude, the readout means being controllable from timing means and from an inhibit arrangement. Storage means are provided for accepting the transfer of amplitude information from the holding means, the storage means storing such information until replaced by subsequent amplitude information from the holding means via the readout means. Means are also provided for recognizing the arrival of a second pulse in any sampling time period, latter means functioning to inhibit the readout means during such sampling time period in which more than one pulse arrives, whereby erroneous information is prevented from being transferred to the storage means.

Figure 2:
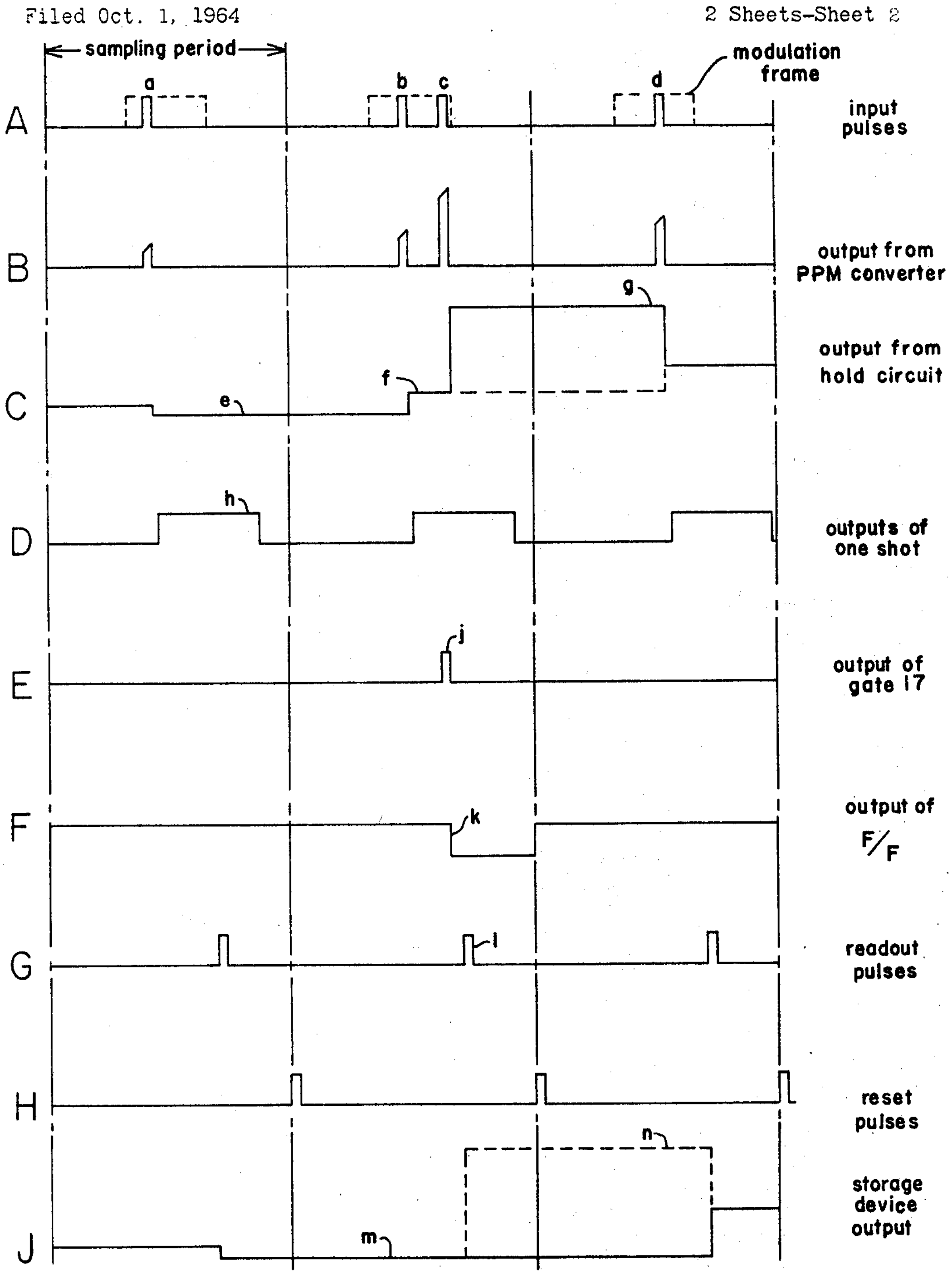

These and other objects, features and advantages will be more apparent upon a study of the appended drawings in which:

FIGURE 1 is a block diagram of the basic components constituting a preferred embodiment of my invention; and FIGURE 2 is a waveform diagram showing the relationships of significant functions of the device shown in FIGURE 1, as they would appear in three successive sampling periods.

Referring to FIGURE 1, PPM to PAM converter 10 receives the incoming PPM pulses on lead A and converts same into amplitude modulated pulses. This device serves therefore as a demodulator, but is not per se a part of my invention, inasmuch as it may be the type of demodulator utilized in any of a number of PPM communication systems. For example, I may wish to use the "Balanced Output Demodulator for Pulse Position Modulation" of Lawrence H. Graham, Serial No. 235,315 filed November 5, 1962. This application has now become Patent No. 3,166,712, and is assigned to the assignee of the present invention. Also, the demodulator may take the form of any of several of the devices described in "Modulation Theory" by H. S. Black, published by D. Van Nostrand in 1953.

As will be apparent, as the position modulated pulse stream enters the demodulator, this device converts the position of each pulse to an amplitude proportional to the time of arrival of each pulse with respect to its timing circuits, thereby to create at output B pulses whose height are a voltage analog of their arrival time. The pulses arriving at the demodulator are depicted on line A of FIGURE 2, and the output pulses on line B. Output B from demodulator 10 is delivered to hold circuit 11 of FIGURE 1 which may be a simple capacitive device such that the charging time constant of the converter 10 and hold circuit 11 is very short compared to the width of the normalized input pulses. The hold circuit 11 output is in turn delivered on lead C to one input of AND gate 12, which has three inputs and serves as a readout gate.

A second input to this gate is lead F, which is connected to flip-flop 13, and a third input is lead G, which delivers a readout pulse from a timing means, such as clock 14. The normal condition for flip-flop 13 is such that its output is a ONE, such ONE appearing at a second input to gate 12. The clock 14 operates at the PPM sampling rate, and upon it supplying a readout pulse to the gate as a third input at the end of each sampling period, the amplitude modulated pulse level held in hold circuit 11 is transferred through the gate to storage circuit 15.

Circuit 15 is capacitive in nature and serves to hold the last amplitude value received until replaced by a new value. Because of this arrangement, the voltage in the holding circuit 15 will change from one sampling period to the next and will hold the value inserted during one sampling period until a new value is inserted at the next sampling period. In this manner, a staircase-like audio wave is normally produced on output J, which is then filtered to recover the original audio intelligence.

The foregoing is the operation carried on when only one pulse is received during a modulation frame, and flip flop 13 is in its normal condition. A more significant part of this invention comes into play, however, when one or more false pulses are received, for at that time other aspects of the circuit shown in FIGURE 1 function to prevent a new, false value from demodulator 10 to be read into the storage circuit 15 by the readout gate 12.

The desirable action of preventing false pulses from being passed through readout gate 12 is accomplished utilizing flip-flop 13, whose normally-present ONE at the input to gate 12 on lead F is removed at such times as more than one pulse is present in a given modulator frame. This is to say, flip-flop 13 is normally in a state which places a ONE or enabling pulse on its output, which drives readout gate 12. In this condition, the readout gate 12 is operable in response to a readout pulse on line G from clock 14 to pass information on to the storage circuit 15, but when in accordance with this invention flip-flop 13 is caused to change to its other state and a ZERO or inhibit pulse is then present on lead F at the readout gate, no output will occur from this gate during the readout pulse from the clock. Immediately following the readout pulse, a reset pulse on lead H from the clock will reset flip-flop 13, preparing it for possible operation during the next sampling period.

Referring to FIGURE 2 for additional indication of the type of operation performed by the elements of my invention described thus far, it will be noted that the stream of pulses depicted on Line A in three successive sampling periods therefore represent normalized and regenerated pulses emanating from the pulse detector section of a pulse position modulation receiver. Shown by dashed lines on Line A of this figure are typical modulation frames which represent the maximum permissible pulse deviation. As previously mentioned, the pulse detection section of conventional PPM receivers would inhibit or block extraneous and interference pulses from the demodulator section of such receiver between such modulation frames. Accordingly, pulses can only occur at input A of FIGURE 1 during the modulation frame times.

For illustrative purposes, three correct speech pulses arriving in three successive modulation frames are depicted as *a*, *b* and *d* on Line A, whereas pulse *c* in the second frame of Line A represents a false or interference pulse. It should be noted that the change in position of the correct pulse from frame to frame has been somewhat exaggerated for illustrative purposes. This is to say, it is well known that for speech wave forms sampled at rates greater than the Nyquist sampling rate, the most probable amplitude of any given sample is that of the previous sample, which therefore means that in most instances only small changes in amplitude occur from sample to sample.

Line B of FIGURE 2 represents the output of converter 10, in which the amplitude of pulses is a function of their relative positions. The amplitude of each successive pulse on Line B is held by hold circuit 11 as shown in Line C, until such amplitude is replaced by a new amplitude. Note that pulse *a*, being on the left of the modulation frame, causes the hold circuit output to drop from its previous value to a level *e*, whereas less-negative pulse *b* causes the hold circuit level to increase to level *f*. As previously mentioned, hold circuit 11 may be a simple capacitive device such that the charging time constant of the converter 10 and the hold circuit 11 is very short compared to the width of the normalized input pulses.

As previously indicated, in the second modulation frame of Line A, pulse *c* is an error pulse, which causes the hold circuit voltage level depicted in Line C to step to a new level *g* from the level *f* brought about by correct pulse *b*. It should be noted that in prior art demodulators, the waveform appearing in Line C is presented to audio filtering and amplifying circuits, and the sudden and severe changes in level due to error pulses, being uncorrelated with the correct pulses, cause loud and objectionable pops and clicks in the audio output. It is to eliminate such undesirable noise from the audio output that invention includes circuits which prevent the transfer of the false level *g* in the hold circuit 11 to the audio output, and enables the level *f* to remain as the output, as shown in dashed lines.

Returning to FIGURE 1, it is noted that in order to eliminate the effect of such false pulses, I employ several components, including AND gate 17, one-shot multivibrator 18, and delay 19. The same pulses from lead A directed to the converter 10 are also directed to one input of AND gate 17, as well as to one shot multivibrator 18 via delay device 19. One-shot multivibrator 18 is normally in an off condition, and by the time that it delivers an output to lead D, because of the delay, the pulse is no longer present on the other lead of Gate 17. On Line D of FIGURE 2 the pulses *h* represent the outputs of one-shot multivibrator 18. The delay between the leading edge of the pulse (or first pulse) in each modulation frame and the leading edge of each one-shot multivibrator pulse is the delay resulting from delay device 19. The desirable length of the pulse output of one-shot multivibrator 18 is longer than the modulation frame time but short enough to recover before the beginning of the subsequent modulation frame.

As a result of pulse *a* on Line A, the hold circuit 11 assumes, as previously mentioned, the level *e* as shown on Line C, inasmuch as pulse *a*, being on the left side of the sample frame represents what may be regarded as a negative-going level. Inasmuch as no subsequent pulse arrives during the first modulation frame of Line A, no pulse passes through AND gate 17 and along lead E to flip-flop 13, which of course does not change from its normally "on" state, and consequently readout gate 12 reads out the proper value, as shown at *m* on Line J in the first illustrated sampling period.

During the second modulation frame, correct pulse *b* arrives as shown in Line A, FIGURE 2. Pulse *b* causes the hold circuit to assume level *f* and the one-shot multivibrator 18 to fire as described for pulse *a*. Prior to the time of next clock readout pulse of Line G and during the second modulation frame, the second pulse *c* representing the error pulse, arrives and causes the hold circuit 11 to step to level *g* on Line C. Pulse *c* has no effect on one-shot 18 since one-shot 18 is in its astable state. However, pulse *c* passes through gate 17, which has an enable pulse from one-shot 18 on its other input, the pulse from this gate appearing at *j* on Line E. Pulse *c* causes flip-flop 13 to trigger as shown at *k* on Line F. This action turns off one of the inputs to readout gate 12 such that readout gate 12 is closed when the next readout pulse *l* from the clock occurs. Consequently, upon the arrival of readout pulse *l*, the storage device 15 desirably does not move from level *m* to the level *n* shown in dashed lines on Line J, thus avoiding a fairly substantial error.

In the third modulation frame, correct pulse *d* arrives, bringing about a proper output from the storage device as shown in the third sampling period on Line J.

As will be appreciated by those skilled in the art, the present invention makes it possible in a position modulated pulse system to substantially reduce the subjective effect of error pulses, that is, the effect on one's ears of the error pulses often present in communications possibly involving crosstalk. In such pulse systems error pulses normally occur at any time in a modulation frame with equal probability. However, these error pulses which occur in a part of the frame representing a large change in amplitude will cause much greater annoyance than an error pulse which occurs at a part of the frame representing a small change in amplitude. Thus, the present invention serves to correct or improve this type of communication problem, with but comparatively small cost and complexity.

As to the other details of this invention, it is to be understood that the timing means is set to operate at the sampling rate at which the rest of the system operates. Synchronization of the timing circuit with the source of the PPM signals is obtained by well known technology, and for example, the demodulator may utilize the teachings of the Fernandez invention entitled "Nonreference Pulse Position Demodulator," Patent No. 3,142,806, issued July 28, 1964, and assigned to the assignee of the present invention, wherein a voltage-controllable oscillator is kept in step with the clock of the transmitter by deriving DC error signals from the incoming pulses, which error signals are used to control the speed of operation of the oscillator, thus providing self-synchronization. Of course, the clock could be directly synchronized by use of transmitting synchronizing signals if such be desired. In either the direct synchronized or self-synchronized case, the clock 14 is effectively part of converter 10 to control the speed of operation of the sawtooth waveform typically employed for converting the incoming PPM pulses to PAM pulses.

While I have described a preferred embodiment of my invention, it is within the spirit of my false pulse rejecting detector to utilize a circuit arrangement which inhibits pulses going to a conventional pulse position demodulator when more than one pulse appears in a sampling period, and which desirably allows an incoming pulse to be fed to the demodulator only when one pulse occurs in a sampling period. As will be obvious to one skilled in the art, the incoming pulse stream in this instance would be delayed and then passed through a gating circuit. This gating circuit is of course controlled in accordance with an obvious application of the devices shown in FIGURE 1 to block the delayed pulses when multiple pulses occur in a sampling period, thereby to achieve the basic goal of this invention in a somewhat different manner.

While I have discussed an application of my invention to a communications system where error pulses arise due to crosstalk from other users in the system, it is clear that the invention will be effective regardless of the source of such error pulses. For example, error pulses can occur due to ignition noise, atmospherics, machinery and similar natural and man-made sources.

Although the illustrative embodiment has shown a single channel communication system, it is clear that my invention is equally applicable to a time-division multiplex system where several modulation frames are present successively in each sampling period. In this instance, each channel of the demultiplexing equipment could advantageously utilize my invention.

I am not to be limited to the described embodiments except as required by the scope of the appended claims.

I claim:

1. A demodulator for demodulating the intelligence contained in modulated pulses occurring in successive sampling periods, storage means connected to said demodulator to receive therefrom an amplitude value representative of the position of the intelligence carrying pulse in each sampling period, and means for preventing transfer of information to said storage means during any sampling period in which more than one pulse appears.

2. The demodulator as defined in claim 1 in which said means for preventing transfer of information to said storage means during any sampling period in which more than one pulse appears includes an AND gate, and inhibit means for selectively preventing the information contained in any sampling period from passing through said gate, by preventing the enabling of said gate when more than one pulse is contained in such sampling period.

3. In a demodulator having capabilities for reducing the subjective effect of error pulses contained in a stream of position modulated pulses appearing in successive sampling periods, means for converting pulse position modulation to pulse amplitude modulation, storage means for accepting a transfer of amplitude information emanating from said converter, and AND gate means for preventing amplitude information reaching said storage means for any sampling period in which more than one pulse was contained.

4. The demodulator as defined in claim 3 in which said AND gate means has a plurality of inputs, with one of said inputs being connected to said means for converting pulse position modulation to pulse amplitude modulation, another one of said inputs being connected to clock means for initiating the transfer of such amplitude information emanating from said converter means, and another of said inputs normally having an enable signal thereon, and inhibit means for removing said enable signal during any sampling period in which a second pulse arrives.

5. A demodulator having means for reducing the subjective effect of error pulses contained in a stream of position modulated pulses appearing in successive sampling periods, said demodulator comprising input means upon which pulses are supplied, converter means for converting pulse position modulation appearing on said input means, into pulse amplitude modulation, storage circuit means for accepting the transfer of amplitude information derived by operation of said converter means, and readout means for controlling such transfer of pulses to said storage circuit, said readout means preventing the passage of any pulses to said storage circuit during any sampling period in which more than one pulse is contained, thereby preventing erroneous information from being transferred to said storage circuit.

6. The demodulator as defined in claim 5 in which said readout means is an AND gate having a plurality of inputs, with one of said inputs being connected to said conveter means, another one of said inputs being connected to clock means, said clock means providing the readout signals of said readout means, and another of said inputs being from an inhibit means, said inhibit means normally supplying an enable signal to said AND gate, but withholding such enable signal, and thereby preventing the enabling of said gate, at such time as more than one pulse is contained in a sampling period.

7. A demodulator for demodulating the intelligence contained in position modulated pulses occurring in successive sampling periods, said demodulator comprising converter means for converting pulse position modulated pulses to pulse amplitude modulated pulses, storage means for accepting the transfer of amplitude information from said converter, and AND gate means for controlling the passage of such information to said storage means, said AND gate having a plurality of inputs, including an input from said converter, a second input of said gate normally having an enable signal thereon, and the third input of said gate receiving a readout pulse at the end of each sampling period, latter pulse thus serving to bring about a transfer through said AND gate of amplitude information, and inhibit means serving to remove the signal on said second input at such time as more than one pulse appears during a sampling period, thereby preventing the transfer of false information to said storage means.

8. The demodulator as defined in claim 7 in which said inhibit means includes gating means having two inputs, the first of said inputs of said gating means receiving a delayed, elongated version of the first pulse of any sampling period, and the second of said inputs receiving an undelayed version of each incoming pulse, the second pulse of any sampling period arriving on said second input to said gating means, occurring during time duration of such delayed, elongated pulse, causing said gating means to be enabled, said gating means when enabled functioning to bring about a removal of the enable pulse on said AND gate, thereby to prevent the transfer of intelligence to said storage means during a sampling period in which more than one pulse is contained.

9. A demodulator having means for reducing the subjective effect of error pulses contained in a stream of position modulated pulses appearing in successive sampling periods, said demodulator comprising means for converting pulse position modulation to pulse amplitude modulation, means for reading out amplitudes from said converter, means for controlling the operation of said readout means, storage means for accepting the transfer of such amplitude information, said storage means storing such amplitude information until replaced by subsequent amplitude information from said readout means, means for recognizing the time of arrival of an initial pulse in each sampling period, and means for recognizing the arrival of a second pulse in any sampling period, latter means functioning to cause said readout means to be inhibited during such sampling period when more than one pulse arrives, whereby erroneous information is prevented from being transferred to said storage means.

10. A demodulator having means for reducing the subjective effect of error pulses contained in a stream of position modulated pulses appearing in successive sampling periods, said demodulator comprising means for converting pulse position modulation to pulse amplitude modulation, means for holding the amplitude of a given output pulse from said converter, readout means for reading out such held amplitude, clock means and inhibit means for controlling the operation of said readout means, storage means for accepting the transfer of amplitude information from said holding means, said storage means storing such amplitude information until replaced by subsequent amplitude information from said holding means via said readout means, means for recognizing the time of arrival of an initial pulse in each sampling period, latter means functioning to cause said inhibit means to inhibit said readout means during such sampling period when more than one pulse arrives, whereby erroneous information is prevented from being transferred to said storage means.

References Cited

UNITED STATES PATENTS 3,212,014 10/1965 Wiggins et al. ------- 329—107

MALCOLM A. MORRISON, *Primary Examiner.*

C. E. ATKINSON, *Assistant Examiner.*